US009958546B2

(12) United States Patent
Setono et al.

(10) Patent No.: US 9,958,546 B2
(45) Date of Patent: May 1, 2018

(54) LASER RANGEFINDER AND METHOD OF MEASURING DISTANCE AND DIRECTION

(71) Applicants: FUNAI ELECTRIC CO., LTD., Osaka (JP); Kyoto University, Kyoto (JP)

(72) Inventors: Shingo Setono, Ikoma (JP); Ryusuke Horibe, Hirakata (JP); Manabu Murayama, Itami (JP); Yuichiro Masuda, Takatsuki (JP); Tomohisa Hirai, Osaka (JP); Atsushi Mushimoto, Daito (JP); Fumitoshi Matsuno, Kyoto (JP)

(73) Assignees: FUNAI ELECTRIC CO., LTD., Osaka (JP); KYOTO UNIVERSITY, Kyoto (JP)

( * ) Notice: Subject to any disclaimer, the term of this patent is extended or adjusted under 35 U.S.C. 154(b) by 355 days.

(21) Appl. No.: 14/790,356

(22) Filed: Jul. 2, 2015

(65) Prior Publication Data
US 2016/0003945 A1   Jan. 7, 2016

(30) Foreign Application Priority Data
Jul. 2, 2014 (JP) .................................. 2014-137132

(51) Int. Cl.
*G01C 3/08* (2006.01)
*G01S 17/42* (2006.01)
(Continued)

(52) U.S. Cl.
CPC ............. *G01S 17/42* (2013.01); *G01S 7/481* (2013.01); *G01S 7/4817* (2013.01); *G01S 7/497* (2013.01); *G01S 7/4915* (2013.01)

(58) Field of Classification Search
CPC ...... G01S 7/42; G01S 17/4817; G01S 17/481; G01S 17/497; G01S 17/4915
(Continued)

(56) References Cited

U.S. PATENT DOCUMENTS

2007/0076189 A1* 4/2007 Kumagai ................. G01C 3/08
356/5.01
2010/0165322 A1 7/2010 Kane et al.
(Continued)

FOREIGN PATENT DOCUMENTS

DE   102 16 405   10/2003
EP   1 195 617    4/2002
(Continued)

OTHER PUBLICATIONS

Extended European Search Report dated Nov. 30, 2015 in corresponding European Application No. 15174836.5.

*Primary Examiner* — Mark Hellner
(74) *Attorney, Agent, or Firm* — Wenderoth, Lind & Ponack, L.L.P.

(57) ABSTRACT

A laser rangefinder includes: a MEMS mirror that changes a traveling direction of laser light; a first photodetector that reflects a portion of the laser light directed in a predetermined direction by the MEMS mirror and receives another portion of the laser light; a second photodetector that receives first reflected light that is reflection of the laser light from a target object outside an enclosure and second reflected light that is reflection of the portion of the laser light from the first photodetector; and a signal processor that calculates a distance from the laser rangefinder to the target object by subtracting, from a first distance from the laser diode to the target object calculated using the first reflected light, a second distance from the laser diode to the first photodetector calculated using the second reflected light, (Continued)

and calculates a direction of the target object with respect to the laser rangefinder.

15 Claims, 14 Drawing Sheets

(51) Int. Cl.
   *G01S 7/481* (2006.01)
   *G01S 7/497* (2006.01)
   *G01S 7/491* (2006.01)

(58) Field of Classification Search
   USPC .......................................... 356/5.01
   See application file for complete search history.

(56) References Cited

U.S. PATENT DOCUMENTS

2014/0218715 A1* 8/2014 Li .................. G01S 7/4813
                                                356/4.01
2015/0288955 A1* 10/2015 Perry ............... H04N 17/002
                                                348/187

FOREIGN PATENT DOCUMENTS

| EP | 2 738 572 | 6/2014 |
|----|-----------|--------|
| JP | 2001-159681 | 6/2001 |
| JP | 2010-204015 | 9/2010 |
| JP | 2012-202803 | 10/2012 |
| WO | 03/087875 | 10/2003 |

\* cited by examiner

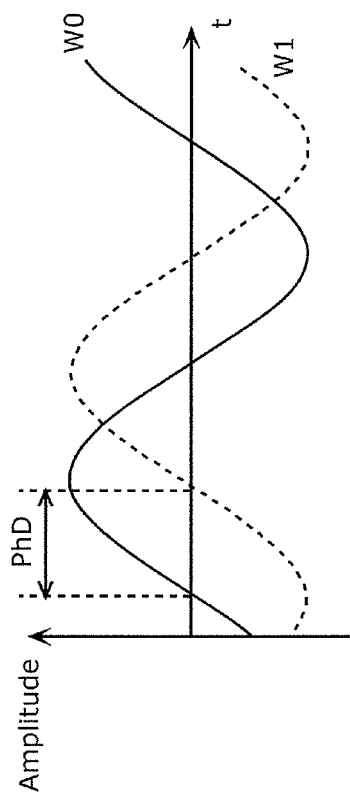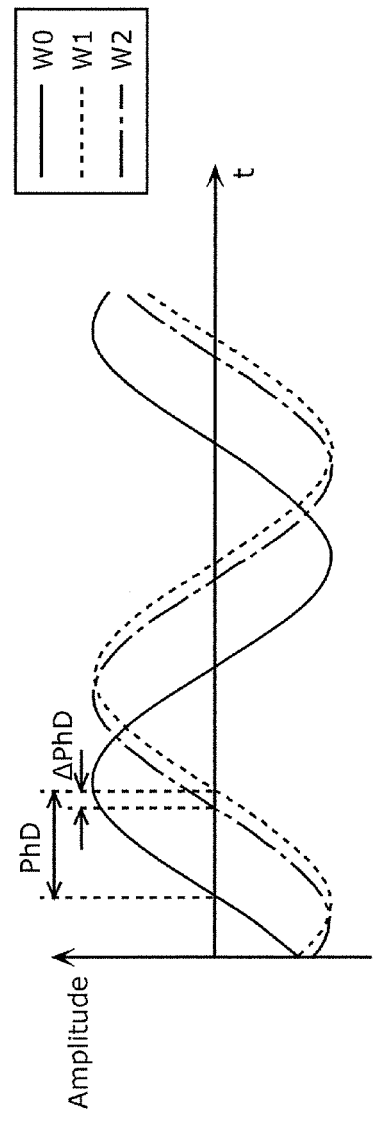

LASER RANGEFINDER AND METHOD OF MEASURING DISTANCE AND DIRECTION

CROSS REFERENCE TO RELATED APPLICATION

The present application is based on and claims priority of Japanese Patent Application No. 2014-137132 filed on Jul. 2, 2014. The entire disclosure of the above-identified application, including the specification, drawings and claims is incorporated herein by reference in its entirety.

FIELD

The present invention relates to a laser rangefinder.

BACKGROUND

Examples of sensors for detection of obstacles or human bodies in autonomous traveling of robots include a laser rangefinder (LRF).

A laser rangefinder measures time taken for output laser light to reflect off a target object and return to the laser rangefinder, and calculates the distance to the target object from the result of the measurement. The laser rangefinder emits laser light, changing the output direction of the laser light vertically and horizontally to measure distances to one or more objects in the whole range for distance measurement (hereinafter referred to as a scanning range).

More specifically, a laser rangefinder includes a laser diode (LD) that emits laser light, a mirror for adjusting the output direction of the laser light, a photodetector that receives light reflected off from objects, and a signal processor, for example. Examples of the mirror for adjusting the output direction of the laser light includes a mirror attached to a rotational mechanism, a polygonal mirror, and a microelectromechanical system (MEMS) mirror. The signal processor outputs an output signal to cause the laser diode to emit laser light, and receives a received-light signal. The signal processor determines the distance to the target object from a difference between the phase of the laser light emitted from the laser diode and the phase of the reflected light received by the photodetector.

In order for the laser rangefinder to measure distances accurately, accurate measurement of a time interval from emission of laser light from the laser diode to receiving of reflected light by the photodetector, that is, accurate calculation of phase difference is necessary. Light travels so fast, and therefore accurate measurement is desirable.

On the other hand, there is a time gap between output of an output signal from the signal processor and actual emission of laser light from the laser diode (signal transmission delay). Moreover, there is a time gap between receiving of reflected light from a target object by the photodetector and arrival of a received-light signal at the signal processor (delay due to conversion of an electric signal). Furthermore, these signal delays may be affected by temperature change or physical degradation with time (time degradation).

Still furthermore, the distance from the light source to the mirror for adjusting the output direction of the laser light may change due to temperature change or time degradation.

In view of this, a method for eliminating such delays has been proposed. In the method, for example, a reflection mirror is provided in a light path in a laser rangefinder and the distance to the reflection mirror is measured to eliminate such delays (see Patent Literature 1, for example). Note that this method requires the reflection mirror and a mechanism that mechanically drives the reflection mirror.

CITATION LIST

Patent Literature

[Patent Literature 1] Japanese Unexamined Patent Application Publication No. 2001-159681

SUMMARY

Technical Problem

However, there are problems with a laser rangefinder further including a reflection mirror in a light path inside the laser rangefinder and a mechanism for mechanical drive of the refection mirror that are added to increase accuracy of distance measurement; such a laser finder is more costly to manufacture and is larger in size.

Furthermore, there is demand for increased accuracy in determination of the direction of objects using laser rangefinders.

Conceived to address the problems, it is a target object of the present invention to provide a laser rangefinder that is more accurate in distance measurement and direction determination, manufacturable at a cost with moderate increase, and has a size with a minimum increase.

Solution to Problem

In order to achieve the above-described object, a laser rangefinder according to an aspect of the present invention includes: an enclosure; a light source that is disposed inside the enclosure and emits laser light; a scanning unit that changes a traveling direction of the laser light; a first photodetector that is disposed inside the enclosure, reflects a portion of the laser light directed in a predetermined direction from the scanning unit, and receives another portion of the laser light; a second photodetector that receives first reflected light and second reflected light, the first reflected light being reflection of the laser light from a target object outside the enclosure, and the second reflected light being reflection of the portion of the laser light from the first photodetector; and a signal processor that calculates a distance from the laser rangefinder to the target object and calculates a direction of the target object with respect to the laser rangefinder, the distance being calculated by (i) calculating a first distance from the light source to the target object using the first reflected light received by the second photodetector, (ii) calculating a second distance from the light source to the first photodetector using the second reflected light received by the second photodetector, and (iii) subtracting the second distance from the first distance, and the direction being calculated by using time points of the receiving of the another portion of the laser light by the first photodetector.

The laser rangefinder thus configured calculates the distance from an opening to the target object by subtracting the second distance from the light source to the first photodetector from the first distance from the light source to the target object. The second distance from the light source to the first photodetector is substantially the same as the distance from the light source to the opening of the enclosure. As described above, the distance from the light source to the scanning unit (for example, a mirror for adjustment of the direction of laser light) may change due to temperature change or time degradation. Therefore, subtracting the second distance from the light source to the first photodetector from the first distance from the light source to the target object eliminates the change in the distance to the target object inside the enclosure.

Furthermore, the laser rangefinder thus configured is capable of deriving change of the direction of the laser light with time using a time at which the first photodetector receives laser light. When a time at which the target object is detected is obtained, the direction of the laser light at the time of the detection of the target object can be derived from the change of the direction of the laser light with time.

Thus, with the single additional photodetector, the laser rangefinder thus configured is free from influence of signal delay and thus measures the distance with increased accuracy, and successfully obtains the direction of the laser light at the time of the detection of the target object.

For example, the first photodetector may have a light-receiving surface having a portion to which paint that reflects the another portion of the laser light is applied. Furthermore, the light-receiving surface may have a first circular shape, and the portion to which the paint is applied may have a second circular shape smaller than the first circular shape. Furthermore, the portion to which the paint is applied may be at a center of the light-receiving surface.

In the laser rangefinder thus configured, the first photodetector may be made simple by the paint that reflects light in a portion of the light-receiving surface of the second photodetector.

Furthermore, the first photodetector may include: a photodetector; and a reflective diffuser plate disposed between the photodetector and the scanning unit.

In the laser rangefinder thus configured, the photodetector and the reflective diffuser plate disposed in a light path from the scanning unit (for example, a MEMS mirror) to the photodetector are included in the first photodetector, so that the first photodetector need not be positioned with increased precision.

Furthermore, the first photodetector may be disposed at a position where none of external light entering the enclosure through an opening of the enclosure is directly incident.

In the laser rangefinder thus configured, the first photodetector is disposed where no external light directly enters, so that influence of external light is reduced.

Furthermore, the first photodetector may further include a shield that blocks external light entering the enclosure through an opening of the enclosure and traveling toward the reflective diffuser plate, and the reflective diffuser plate may be disposed adjacent to the shield between the first photodetector and the scanning unit.

In the laser rangefinder thus configured, the shield that blocks external light traveling toward the first photodetector and the reflective diffuser plate disposed to be in contact with the light-blocking unit successfully prevents external light from entering the reflective diffuser plate.

Furthermore, the signal processor may calculate the direction of the target object with respect to the laser rangefinder by obtaining a time point of the detecting of the target object, determining an interval between times points at which the laser light passes over the first photodetector, from the time points of the receiving of the another portion of the laser light by the first photodetector, calculating a sine wave representing directional displacement of the laser light against time, using the interval and an angle of the predetermined direction, and calculating a direction of the laser light using the sine wave and the time point of the detecting of the target object.

The laser rangefinder thus configured is capable of deriving the direction of the laser light at the time of detection of the target object from the time at which the target object is detected and the change of the direction of the laser light with time.

Furthermore, the first photodetector may be disposed close to an opening of the enclosure.

In the laser rangefinder thus configured, less of the first reflected light from the target object is blocked by the first photodetector unit.

Furthermore, the first photodetector unit may be disposed close to an end of a scanning range of the laser light scanned by the scanning unit.

In the laser rangefinder thus configured, the negative effect of the first reflected light on the scanning of the laser light is reduced.

Furthermore, the scanning unit may include a mirror portion that oscillates about a predetermined axis and reflects the laser light emitted from the light source.

The laser rangefinder thus configured scans laser light by oscillating the mirror portion.

Furthermore, the laser range finder may further include a mirror that is in a path of the laser light between the light source and the mirror portion, transmits the laser light from the light source toward the mirror portion, and reflects, toward the second photodetector, the first reflected light and the second reflected light reflected by the mirror portion.

The laser rangefinder thus configured scans laser light and receives the first reflected light using the single mirror portion, so that the laser rangefinder has a size with a minimum increase.

Furthermore, the mirror may have a reflective surface and a hole in the reflective surface, and the laser light from the light source may pass through the hole.

The laser rangefinder thus configured scans laser light and receives the first reflected light using the single mirror portion, so that the laser rangefinder has a size with a minimum increase.

The scanning unit may be a microelectromechanical system (MEMS) mirror.

The laser rangefinder thus configured uses the MEMS mirror as a scanning unit.

A method of measuring a distance and a direction according to an embodiment of the present invention includes: changing a traveling direction of laser light from a light source with time; when the laser light is directed in a predetermined direction, reflecting a portion of the laser light and receiving another portion of the laser light at a predetermined position inside an enclosure of a laser rangefinder; receiving second reflected light that is the portion of the laser light reflected at the predetermined position; when the laser light is directed in a direction other than the predetermined direction, receiving first reflected light reflected by a target object outside the enclosure; calculating a first distance from the light source to the target object using the first reflected light; calculating a second distance from the light source to the predetermined position using the second reflected light; calculating a distance from the laser rangefinder to the target object by subtracting the second distance from the first distance; and calculating a direction of the target object with respect to the laser rangefinder using time points of the receiving of the another portion of the laser light.

The method of measuring a distance and a direction produces the same advantageous effects as the above-described laser rangefinder.

Advantageous Effects

A laser rangefinder according to the present invention is more accurate in distance measurement and direction determination, manufacturable at a cost with moderated increase, and has a size with a minimum increase.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 8 is a graph illustrating an exemplary waveform of laser light emitted by a laser diode and an exemplary waveform of light received by a second photodetector in the embodiment.

FIG. 9 is a graph illustrating an exemplary waveform of laser light emitted by the laser diode, an exemplary waveform of first reflected light received by the second photodetector, and an exemplary waveform obtained by eliminating influence of signal delay from the first reflected light in the embodiment.

DESCRIPTION OF EMBODIMENTS

Figure 1:
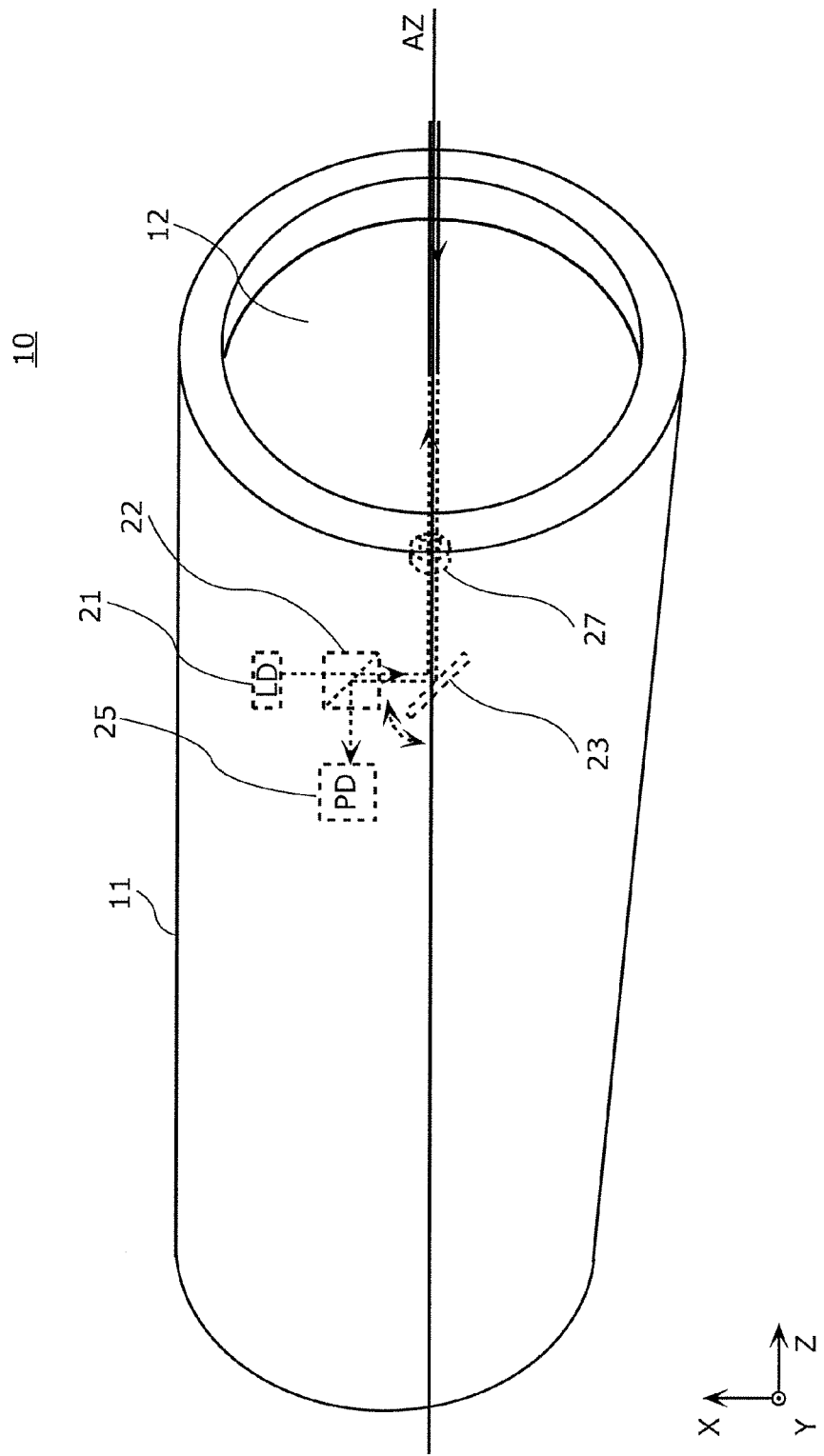
FIG. 1 is a perspective view illustrating an exemplary configuration of a laser rangefinder in an embodiment.

Hereinafter, an embodiment of the present invention is described in detail with reference to the accompanying drawings. Note that the dimensions, dimensional ratios, and the like in the drawings are not strictly accurate.

The embodiment described below shows a preferable specific example of the present invention. The numerical values, shapes, materials, constituent elements, the arrangement and connection of the constituent elements, steps, the processing order of the steps etc. shown in the following embodiment are mere examples, and therefore do not limit the scope of the present invention. The scope of the present invention is defined by the claims. Therefore, among the constituent elements in the following embodiment, constituent elements not recited in any one of the independent claims are not always necessary for the present invention to solve the problem but shall be described as constituent elements of a preferable embodiment.

Embodiment

The following describes a laser rangefinder according to an embodiment with reference to FIGS. 1 to 14.

[1. Configuration of Laser Rangefinder]

FIG. 1 is a perspective view illustrating an exemplary configuration of a laser rangefinder 10 according to the present embodiment. In FIG. 1, the Z axis is parallel to the AZ axis (reference direction) of the laser rangefinder, and the X axis and the Y axis are parallel to an objective lens 12 and an eyepiece lens (not shown in the drawings).

Examples of a laser rangefinder according to the present embodiment include, but are not limited to the laser rangefinder 10 described below as a monocular laser rangefinder. The laser rangefinder according to the present embodiment may have separate lenses including a lens for outputting laser light and a lens for receiving light reflected off from a target object.

Figure 2:
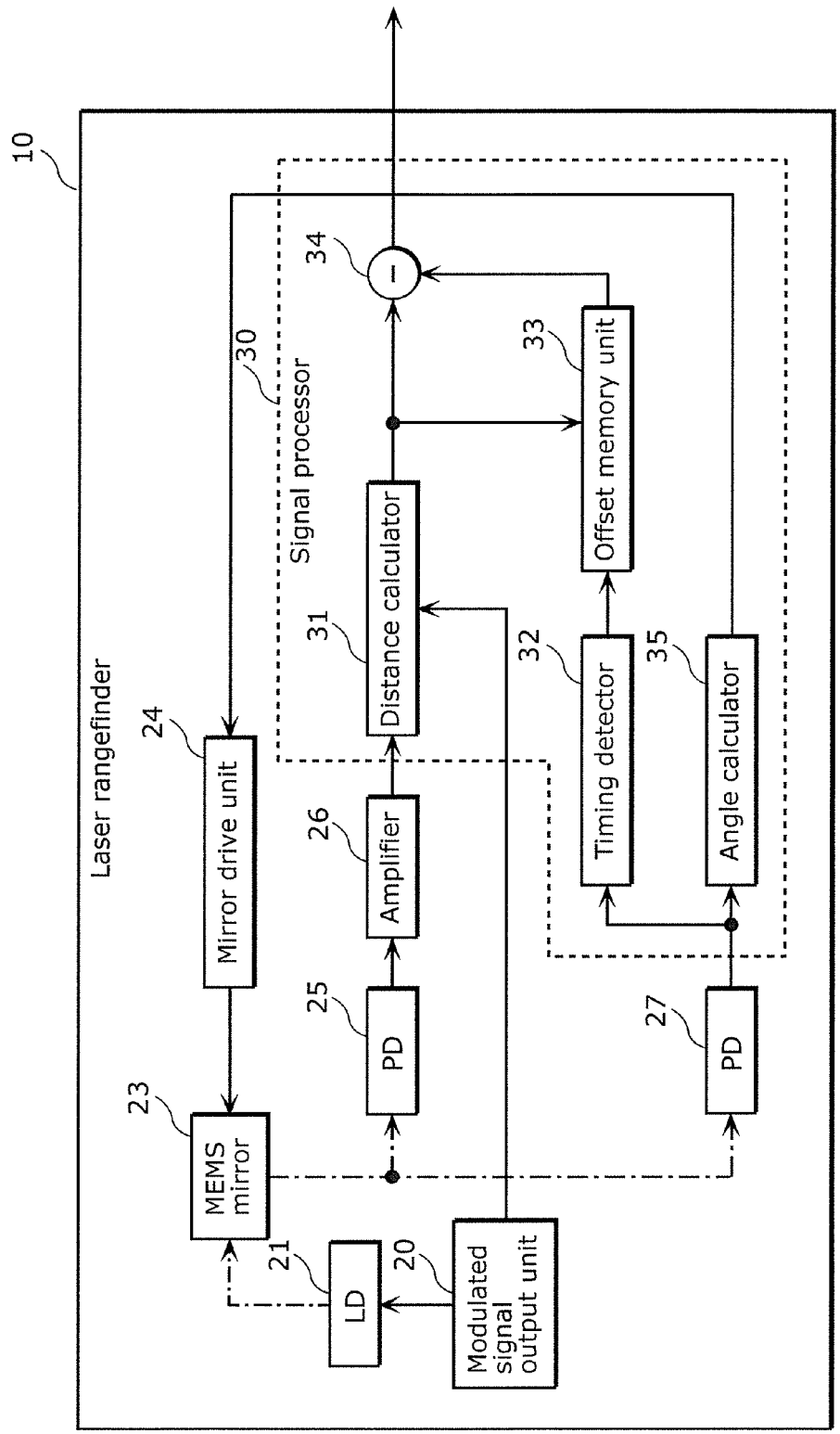
FIG. 2 is a block diagram illustrating an exemplary configuration of the laser rangefinder in the embodiment.

FIG. 2 is a block diagram illustrating an exemplary configuration of the laser rangefinder 10 according to the present embodiment. In FIG. 2, arrows with solid line represent pathways of electric signals, and arrows with alternately long- and short-dashed lines represent pathways of light.

Figure 3:
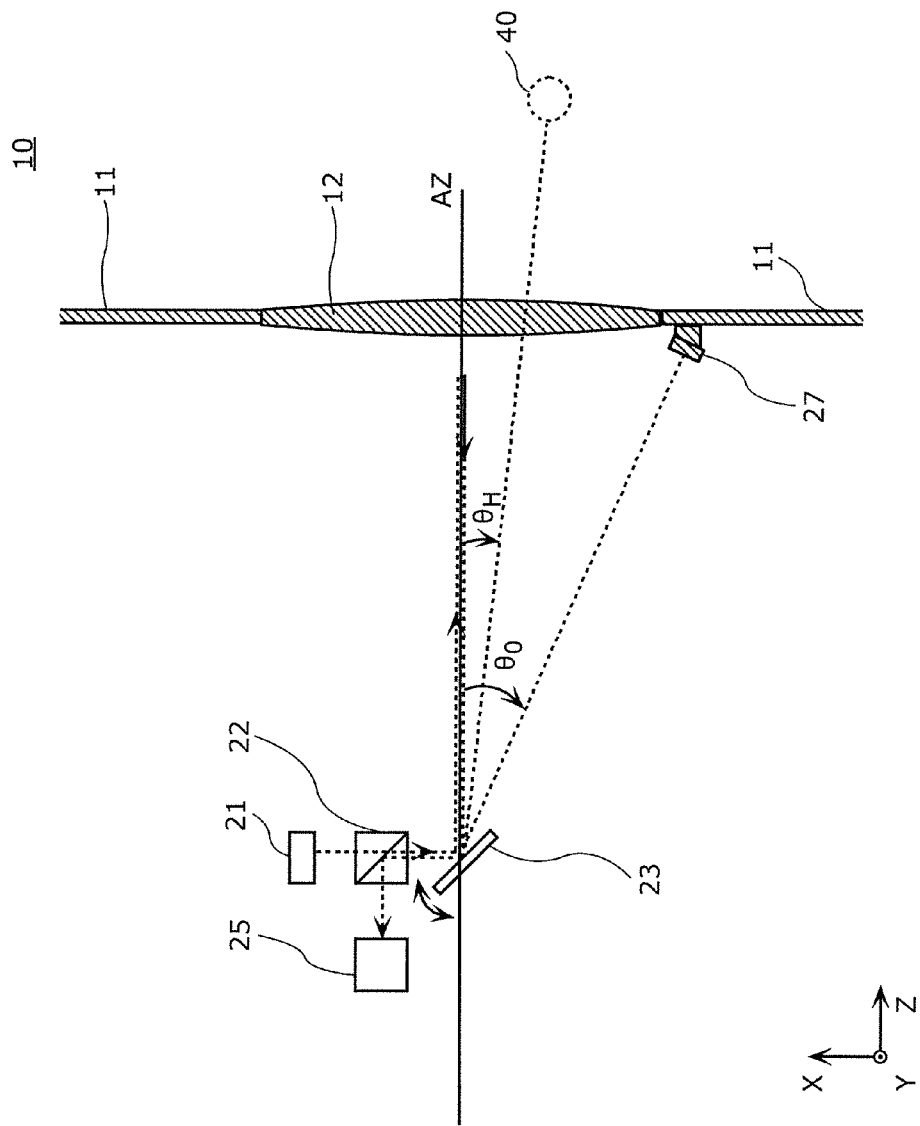
FIG. 3 illustrates an exemplary positional relation of units included in the laser rangefinder in the embodiment.

FIG. 3 illustrates an exemplary positional relation of a laser diode 21, a holed mirror 22, an MEMS mirror 23, a second photodetector 25, and a first photodetector 27 of the laser rangefinder 10 in the present embodiment.

As illustrated in FIGS. 1 to 3, the laser rangefinder 10 includes an enclosure 11 having a cylindrical shape, the eyepiece lens (now shown in the drawings) in an opening at the bottom of the enclosure 11, and the objective lens 12 in an opening at the top of the enclosure 11. The openings each have a circular shape.

The laser rangefinder 10 further includes, inside the enclosure 11, a modulated signal output unit 20, the laser diode 21, the holed mirror 22, the MEMS mirror 23, a mirror drive unit 24, the second photodetector 25, an amplifier 26, the first photodetector 27, and a signal processor 30.

[1-1. Modulated Signal Output Unit, Laser Diode, and Holed Mirror]

The modulated signal output unit 20 generates a modulated signal to cause the laser diode 21 to emit laser light.

The laser diode 21, which is an example of a laser light source, emits laser light according to the modulated signal output from the modulated signal output unit 20. The laser diode 21 is disposed inside the enclosure and emits laser light toward the MEMS mirror 23.

The laser light emitted from the laser diode 21 passes through a hole in the holed mirror 22, and then is reflected by the MEMS mirror 23. After being reflected by the MEMS mirror 23, part of the laser light is output outward from the objective lens in the opening at the top of the enclosure 11 of the laser rangefinder 10. Furthermore, after being reflected by the MEMS mirror 23, the other part of the laser light is reflected by the first photodetector 27 provided inside the enclosure 11 of the laser rangefinder 10.

First reflected light, which is reflection of laser light from the target object 40, is condensed by the objective lens 12 in one of the openings of the enclosure 11. The first reflected light condensed by the objective lens 12 is reflected from the MEMS mirror 23 toward the holed mirror 22. The first reflected light is further reflected from the holed mirror 22 toward the second photodetector 25. Second reflected light, which is reflected by the first photodetector 27, is further reflected from the MEMS mirror 23 toward the holed mirror 22. The first reflected light and the second reflected light reflected by the holed mirror 22 are received by the second photodetector 25.

As illustrated in FIG. 3, the holed mirror 22 transmits laser light emitted by the laser diode as it is, and reflects light from the MEMS mirror 23 (the first reflected light from the target object 40 and the second reflected light from the first photodetector 27). The holed mirror 22 is in the path of the laser light between the laser diode 21 and the MEMS mirror 23.

More specifically, the holed mirror 22 includes a plate-like member having a reflective surface that reflects light from the MEMS mirror 23 toward the second photodetector 25. The platy member has a hole that let laser light emitted by the laser diode 21 pass through the MEMS mirror 23 as it is. The laser light passing through the holed mirror 22 is already collected, and therefore the area of the hole may be substantially small. The intensity of light reflected from the target object 40 is low compared to the laser light, and therefore the area of the hole is preferably small to secure a sufficient area of the reflective surface.

[1-2. MEMS mirror and Mirror Drive Unit]

The MEMS (microelectromechanical system) mirror 23 is an example of a scanning unit that changes the output direction of laser light emitted by the laser diode 21. In other words, the MEMS mirror 23 changes the traveling direction of laser light from the light source with time. In the MEMS mirror 23, a silicon substrate including electronic circuitry has a mirror thereon. The mirror is a very small mechanical part.

Figure 4:
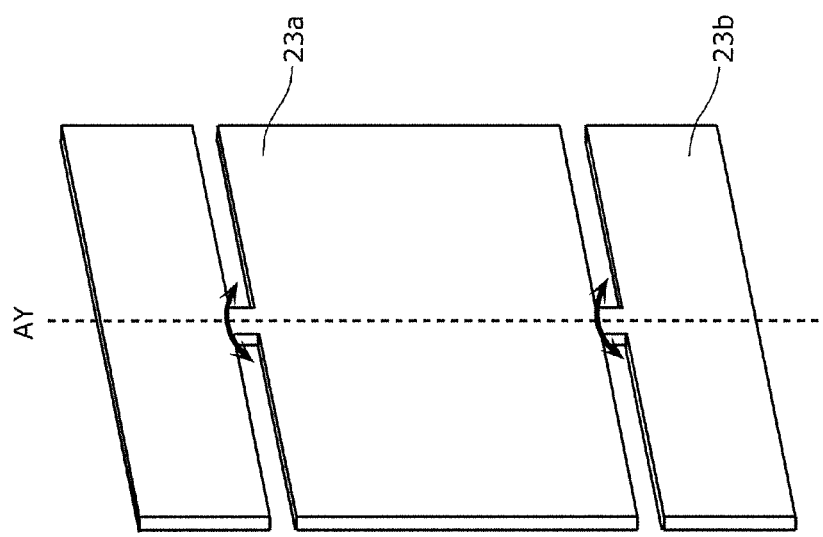
FIG. 4 illustrates an exemplary configuration of an MEMS mirror in the embodiment.
Figure 5:
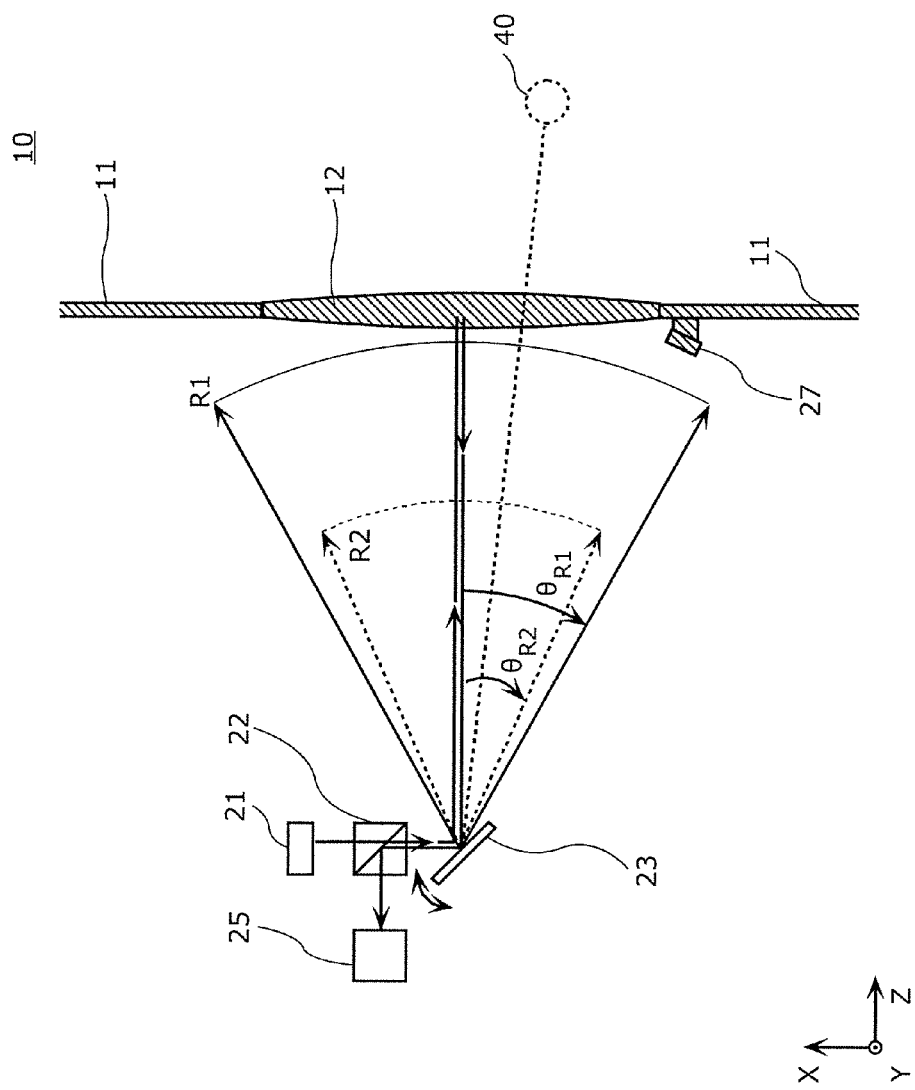
FIG. 5 illustrates an exemplary change along the X axis in the direction in which the laser light reflected by the MEMS mirror in the embodiment.

FIG. 4 illustrates an exemplary configuration of the MEMS mirror 23 in the present embodiment. FIG. 5 illustrates an exemplary change along the X axis in the direction in which laser light is reflected by the MEMS mirror 23 in the present embodiment.

In the following, the X axis is assumed to be horizontal, and the Y axis is assumed to be vertical for illustrative purposes. This assumption is used as an example. The X axis need not be parallel to the horizontal direction, and the Y axis need not be parallel to the vertical direction.

As illustrated in FIG. 4, the MEMS mirror 23 includes a mirror portion 23*a* and a mirror oscillator 23*b*.

The mirror portion 23*a* has the reflective surface that reflects laser light emitted by the laser diode 21. The mirror oscillator 23*b* oscillates the reflective surface about an AY axis passing through the central portion of the mirror portion. The AY axis is parallel to the Y axis. The mirror oscillator 23*b* is driven at a resonant frequency by voltage provided from the mirror drive unit 24. The angle of oscillation along the X axis of the mirror portion 23*a* (oscillation angle) is designed to be θR1 but the actual angle of oscillation may change to θR2 as illustrated in FIG. 5 due to temperature change or time degradation, for example. The MEMS mirror 23 is designed to have such an oscillation angle θR1 or θR2 in FIG. 5 that the scanning range spans the opening at the top of the enclosure 11 with a small margin on the rim of the opening.

The mirror drive unit 24 generates a driving current for driving the mirror oscillator 23*b* and provides the driving current to the mirror oscillator 23*b*.

[1-3. First Photodetector]

The first photodetector 27 in the present embodiment includes a photodetector that reflects a portion of laser light directed in a predetermined direction from the scanning unit and receives another portion of the laser light. More specifically, when laser light is directed in a predetermined direction by the MEMS mirror 23, the first photodetector 27 disposed at a predetermined position in the enclosure 11 reflects a portion of the laser light and receives another portion of the laser light. The first photodetector 27 outputs an output signal (electric signal) to a timing detector and an angle calculator 35 of the signal processor 30, increasing the voltage value of the output signal as the intensity of the received light increases.

As illustrated in FIG. 1 and FIG. 3, the first photodetector 27 in the present embodiment is disposed in a position inside the enclosure 11, and the position is close both to the objective lens 12 and to an end of the scanning range of the laser light. As illustrated in FIG. 3, the first photodetector 27 is disposed at a position in the direction at an angle of θ0 from the AZ axis.

Figure 6:
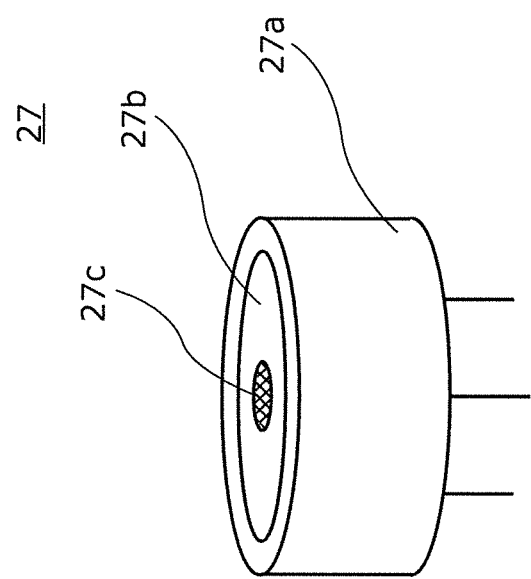
FIG. 6 is a perspective view illustrating an exemplary configuration of a first photodetector in the embodiment.

FIG. 6 is a perspective view illustrating an exemplary configuration of the first photodetector 27 in the present embodiment. As illustrated in FIG. 6, the first photodetector 27 includes a photodetector 27*a* having a light-receiving surface 27*b*. The light-receiving surface 27*b* has a portion to which paint 27*c* is applied. The light-receiving surface 27*b* in the present embodiment is a surface of a circular glass plate having a diameter of five millimeters. The paint 27*c* may be any paint capable of reflecting laser light from the MEMS mirror 23, such as white paint. The portion to which the paint 27*c* is applied in the present embodiment is at the center of the light-receiving surface 27*b* and has a circular shape having a diameter of one millimeter.

[1-4. Second Photodetector and Amplifier]

The second photodetector 25 includes a photodetector that receives light from the holed mirror 22. The photodetector includes a light-receiving surface of glass. The second photodetector 25 receives first reflected light that is reflection of laser light from the target object 40 outside the enclosure 11 and is modulated by the enclosure 11, and second reflected light that is reflection of laser light from the first photodetector 27. More specifically, when laser light is directed in a predetermined direction by the MEMS mirror 23, the second photodetector 25 receives the second reflected light reflected by the first photodetector 27. Furthermore, when laser light is directed in a direction other than the predetermined direction by the MEMS mirror 23, the second photodetector 25 receives the first reflected light reflected by the target object 40 outside the enclosure 11. The second photodetector 25 outputs an output signal (electric signal) to a distance calculator 31 of the signal processor 30 via the amplifier 26, increasing the voltage value of the output signal as the intensity of the received light increases.

The amplifier 26 amplifies the signal output from the second photodetector 25. In particular, the intensity of the first reflected light back into the laser rangefinder 10 is rather low compared to laser light traveling outward from the MEMS mirror 23 because the first reflected light has been reflected and scattered by the target object 40. Thus, the amplifier 26 amplifies the output signal received from the second photodetector 25. An amplifier for the first photodetector 27 is not necessary because influence of reflection and scattering on the second reflected light is small.

[1-5. Signal Processor]

The signal processor 30 includes a distance calculator 31, a timing detector 32, an offset memory unit 33, a subtractor 34, and an angle calculator 35 as illustrated in FIG. 2. The signal processor 30 may be implemented using a system large-scale integrated (LSI) circuit or an integrated circuit (IC). Optionally, the signal processor 30 may be implemented as a microcontroller.

The distance calculator 31 calculates a first distance from the laser diode 21 to the target object 40 and a distance from the laser diode 21 to the opening at the top of the enclosure 11. Assume that the distance from the laser diode 21 to the opening of the enclosure 11 is equal to a second distance from the laser diode 21 to the first photodetector 27. In the present embodiment, the second distance from the laser diode 21 to the first photodetector 27 is therefore calculated as the distance from the laser diode 21 to the opening of the enclosure 11.

More specifically, the distance calculator 31 calculates the first distance from the laser diode 21 to the target object 40 using the first reflected light received by the second photodetector 25, and calculates the second distance from the laser diode 21 to the first photodetector 27 using the second reflected light received by the second photodetector 25. The first distance and the second distance are calculated using the same method.

In order to calculate the distance from the laser diode 21 to the target object 40, for example, a time interval from emission of the laser light from the laser diode 21 to receiving of the first reflected light by the second photodetector 25 is calculated from a phase difference between the laser light emitted from the laser diode 21 and the first reflected light received by the second photodetector 25. The time interval is a round-trip time of the laser light between the laser diode 21 and the target object 40. The distance calculator 31 calculates the distance from the laser diode 21 to the target object 40 by multiplying half the round-trip time by the speed of light. Similarly, the distance calculator 31 calculates the distance from the laser diode 21 to the first photodetector 27 from a phase difference between the laser light emitted from the laser diode 21 and the second reflected light received by the second photodetector 25.

Note that both the distances calculated by the distance calculator 31 (the distance from the laser diode 21 to the target object 40 and the distance from the laser diode 21 to the first photodetector 27) are influenced by temperature change, for example.

The distance calculator 31 calculates a distance in synchronization with a control clock signal (a period for counting by a counter). The number of times stored in the counter corresponds to elapsed time.

The timing detector 32 detects time points of receiving of the second reflected light by the second photodetector 25. The timing detector 32 detects, as a time point of receiving of the second reflected light by the second photodetector 25, a time point at which the intensity of the signal output from the first photodetector 27 is above a certain level (for example, each time point at which the signal reaches a maximum in FIG. 11). At the time point, the distance calculator 31 outputs a value indicating the distance from the laser diode 21 to the first photodetector 27. Values output by the distance calculator 31 at the other time points each indicate a distance from the laser diode 21 to the target object 40. The timing detector 32 stores the value output from the distance calculator 31 at the detected time point in the offset memory unit 33. The offset memory unit 33 thereby stores the distance from the laser diode 21 to the first photodetector 27 (=offset value).

The offset memory unit 33 is implemented using a memory to store, as an offset value, a distance inside the enclosure 11 calculated by the distance calculator 31. For example, the offset memory unit 33 includes a random access memory (RAM).

The subtractor 34 subtracts an offset value stored in the offset memory unit 33 from a distance calculated by the distance calculator 31.

The angle calculator 35 calculates the direction of the target object 40 with respect to the laser rangefinder 10 using time points of receiving of laser light by the first photodetector 27.

[2. Operation of the Signal Processor]

The following describes operation of the signal processor 30 with reference to FIGS. 7 to 13.

The signal processor 30 in the present embodiment performs distance measurement to measure the distance from the opening of the enclosure 11 to the target object 40 and angle calculation to determine the direction of the target object 40.

[2-1. Distance Measurement]

Figure 7:
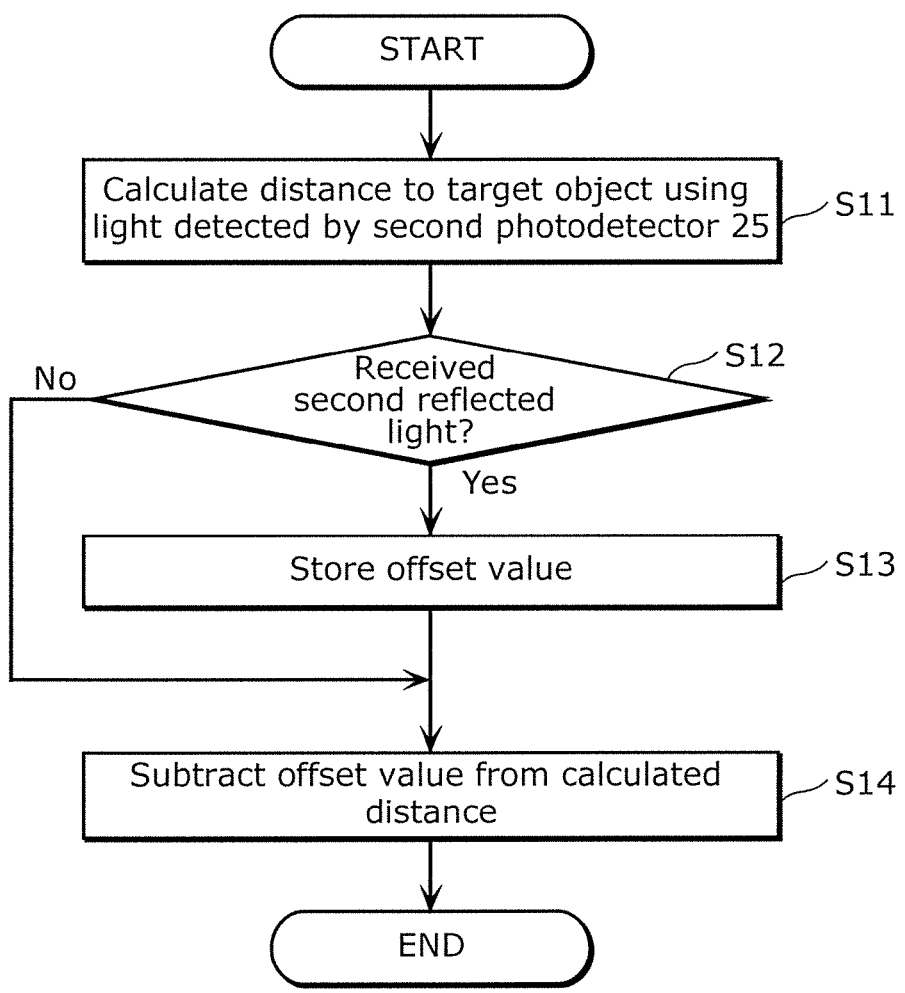
FIG. 7 is a flowchart illustrating an exemplary procedure of distance measurement in the embodiment.

FIG. 7 is a flowchart illustrating an exemplary procedure of distance measurement in the present embodiment.

The distance calculator 31 calculates a first distance from the laser diode 21 to the target object 40 using first reflected light, and calculates a second distance from the laser diode 21 to the first photodetector 27 using second reflected light (S11).

For example, the distance calculator 31 calculates a time interval from emission of laser light from the laser diode 21 to receiving of reflected light by the second photodetector 25 using a phase difference between the emission of the laser light and the receiving of the light, and then calculates a distance using the time interval and the speed of light. The light received by the second photodetector 25 includes first reflected light and second reflected light. As described above, the first reflected light is light that is reflection of laser light from the target object 40, and the second reflected light is reflection of laser light from the first photodetector 27. The method of calculating a distance in the present embodiment is not limited to the above-described method in which a phase difference is used. Such phase difference is used when the laser diode 21 outputs a temporally continuous laser beam. Optionally, for example, when laser light is blinked, an interval from the beginning of emission of the laser light to receiving of the laser light may be used as a time interval to calculate a distance.

When the light received by second photodetector 25 is the first reflected light, the distance from the laser diode 21 to the target object 40 is calculated. When the light received by the second photodetector 25 is the second reflected light, the distance from the laser diode 21 to the opening is calculated.

The distance calculated by the distance calculator 31 is affected by a signal delay due to temperature change, time degradation, and other factors because the result of the measurement is affected by the signal delay.

FIG. 8 is a graph illustrating an exemplary waveform W0 of laser light emitted by the laser diode 21 and an exemplary waveform W1 of light received by the second photodetector 25 in the present embodiment. As illustrated in FIG. 8, there is a phase difference PhD between the laser light emitted by the laser diode 21 and the light received by the second photodetector 25, that is, a time interval corresponding to the phase difference PhD. The distance calculator 31 calculates a distance by multiplying the phase difference PhD by the speed of light.

The timing detector 32 detects a time point of receiving of the second reflected light by the second photodetector (S12). When the timing detector 32 detects a time point of receiving of the second reflected light by the second photodetector (S12, Yes), the timing detector 32 stores, as an offset value (the distance from the laser diode 21 to the opening), the result of distance calculation output from the distance calculator 31 in the offset memory unit 33.

The subtractor 34 subtracts the offset value stored in the offset memory unit 33 from a distance calculated by the distance calculator 31 (S13). When the distance calculated by the distance calculator 31 is a distance from the laser diode 21 to the target object 40, that is, when the timing detector 32 detects a time point of receiving of the first reflected light by the second photodetector 25, the subtractor 34 subtracts the distance from the laser diode 21 to the opening from the distance from the laser diode 21 to the target object 40. The subtractor 34 thus outputs the distance from the opening to the target object 40.

As with the distance from the laser diode 21 to the target object 40 calculated by the distance calculator 31, the offset value is affected by temperature change, time degradation, and other factors. Thus, subtracting the offset value from the distance calculated by the distance calculator 31 yields the distance from the opening to the target object 40 free from the influence of temperature change, time degradation, and other factors. In other words, subtracting the offset value eliminates the influence of signal delay.

FIG. 9 is a graph illustrating an exemplary waveform W0 of laser light, an exemplary waveform W1 of light received by the second photodetector 25, and an exemplary waveform W2 obtained by eliminating influence of signal delay from the waveform W1 of the first reflected light in the embodiment. For example, there is a phase difference PhD between the waveform W0 and the waveform W1 as illustrated in FIG. 9. There is also a phase difference ΔPhD between the waveform W1 and the waveform W2. ΔPhD corresponds to the offset value. Subtracting the offset value stored in the offset memory unit 33 from the distance calculated using the waveform W1 eliminates the influence of the above-described signal delay.

The subtractor 34 outputs the result of the calculation outside the signal processor 30, for example, to a display unit of the laser rangefinder 10. When the distance calculated by the distance calculator 31 is the distance from the laser diode 21 to the first photodetector 27, that is, when the timing detector 32 detects a time point of receiving of the second reflected light by the second photodetector 25, the distance calculated by the distance calculator 31 is equal to the offset value, and therefore the result of the calculation by the subtractor 34 is zero. Thus, the subtractor 34 outputs the result of calculation of the distance from the opening to the target object 40 and does not output the distance from the laser diode 21 to the opening.

[2-2. Angle Calculation]

Figure 10:
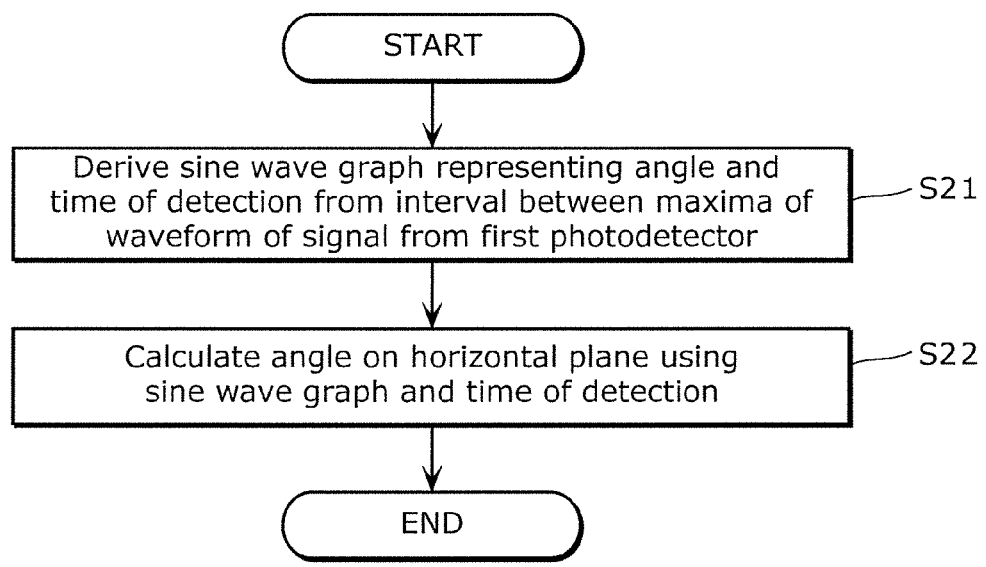
FIG. 10 is a flowchart illustrating an exemplary procedure of angle calculation in the embodiment.

FIG. 10 is a flowchart illustrating an exemplary procedure of angle calculation in the present embodiment.

The angle calculator 35 derives, from the waveform of a signal output from the first photodetector 27, a graph of a sine wave that represents a relationship between angle and time of detection (step S21).

Figure 11:
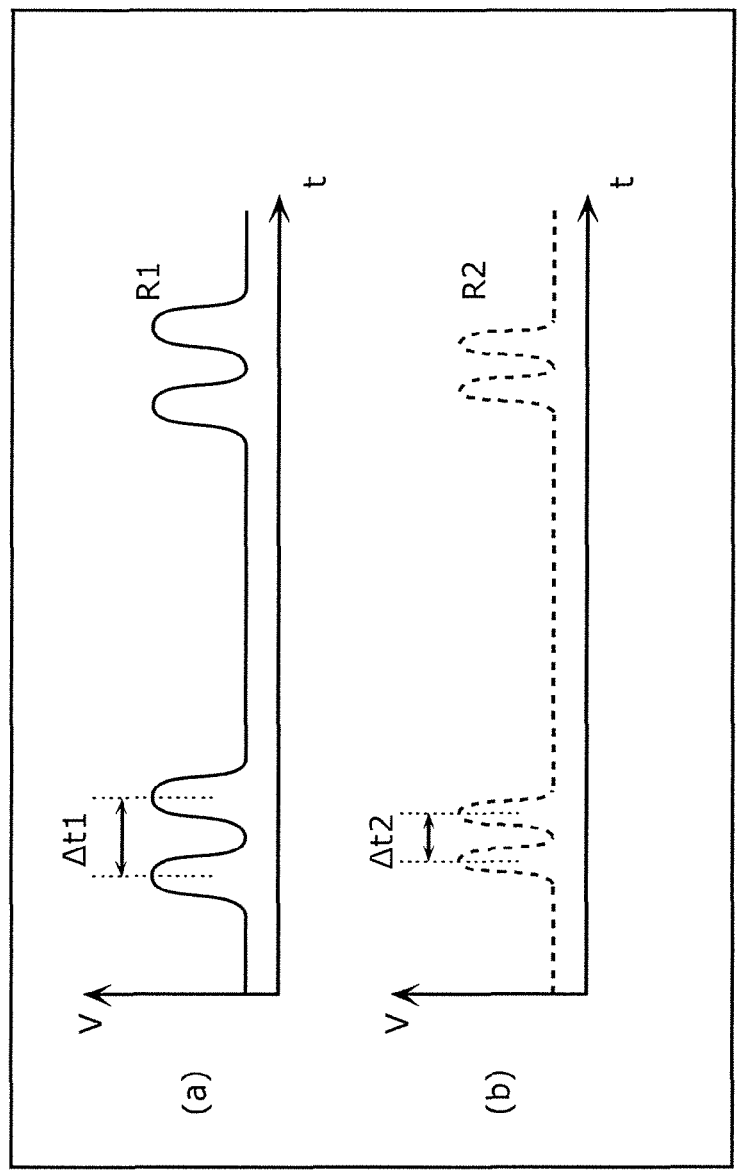
FIG. 11 is a graph illustrating an exemplary signal output from the first photodetector in the embodiment.

FIG. 11 is a graph illustrating an exemplary signal output from the first photodetector 27 in the present embodiment. (a) in FIG. 11 illustrates the waveform of a signal output from the first photodetector 27 when laser light is swung across the scanning range R1 in FIG. 5. (b) in FIG. 11 illustrates the waveform of a signal output from the first photodetector 27 when laser light is swung across the scanning range R2 in FIG. 5.

As illustrated in (a) or (b) in FIG. 11, the signal output from the first photodetector 27 reaches a maximum when the laser light passes over the first photodetector 27. The laser light passes over the first photodetector 27 while moving outward (farther away from the AZ axis), and then passes over the first photodetector 27 again while moving back inward (toward the AZ axis) from an end of the scanning range. As a result, pairs of two maxima are present in the waveform at regular intervals. In the present embodiment, a pair of maxima used for the angle calculation is, but not limited to the pair of two maxima that appears after the target object 40 is detected. For example, the angle calculation may be performed using two pairs of maxima before and after detection of the target object 40 or one of the two pairs of maxima temporally closer to the detection of the target object 40 than the other.

The angle calculator 35 obtains a time interval between the two maxima from the waveform output from the first photodetector 27. In the enclosure illustrated in (a) in FIG. 11, the angle calculator 35 obtains a time interval Δt1, and in the enclosure illustrated in (b) in FIG. 11, the angle calculator 35 obtains a time interval Δt2. As can be seen from FIG. 5 and FIG. 11, the longer the time interval between two maxima in a pair is, the larger the oscillation angle of the MEMS mirror 23 is.

Here, the angle of the laser light from the AZ axis at the time point of appearance of a maximum coincides with the angle of the direction of the first photodetector 27 with respect to the AZ axis, that is, the angle θ0 described with reference to FIG. 3.

Furthermore, the cycle of the sine wave is assumed to be constant (and already known) regardless of influence of the signal delay due to temperature change, time degradation, or other factors.

The angle calculator 35 derives a graph of a sine wave that represents a relationship between angle and time under these conditions. More specifically, the angle calculator 35 derives a sine wave having intersections with the line at the angle θ0 so that the distance between the intersections (the width of an interval having maxima at both ends of the interval) is Δt1 or Δt2.

Figure 12:
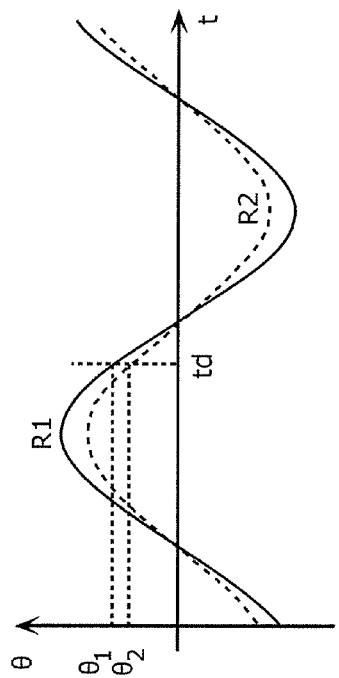
FIG. 12 is a graph illustrating an exemplary sine wave representing a relationship between angle and time of detection in the embodiment.

FIG. 12 is a graph illustrating an exemplary sine wave representing a relationship between angle and time of detection in the embodiment. One of the sine waves in FIG. 12 is an example of a sine wave corresponding to the scanning range R1 in FIG. 5, and the other is an example of a sine wave corresponding to R2 in FIG. 5.

The angle calculator 35 calculates the angle corresponding to the time of detection of the target object 40 using the graph of a sine wave derived in step S21 as illustrated in FIG. 10 (step S22). The time of detection of the target object 40 is obtained by measurement. The time of detection of the target object 40 is denoted by t1, for example.

Figure 13:
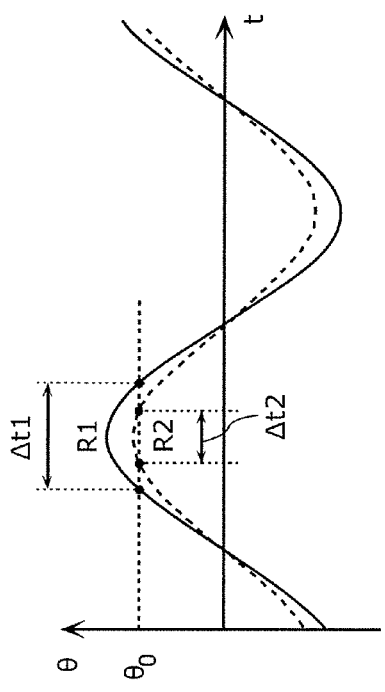
FIG. 13 is a graph illustrating an exemplary method of determining the angle of the direction of a target object in the embodiment.

FIG. 13 is a graph illustrating an exemplary method of determining the angle of the direction of the target object 40 in the present embodiment. The angle calculator 35 calculates the angle corresponding to the time of detection of the target object 40 from the intersection between a line indicating the time t1 and the sine wave. When the time of detection is td for both of the scanning ranges R1 and R2 in FIG. 5, an angle θ1 is derived as the angle of the direction of the target object 40 for the scanning range R1, and an angle θ2 is derived as the angle of the direction of the target object 40 for the scanning range R2.

Figure 14:
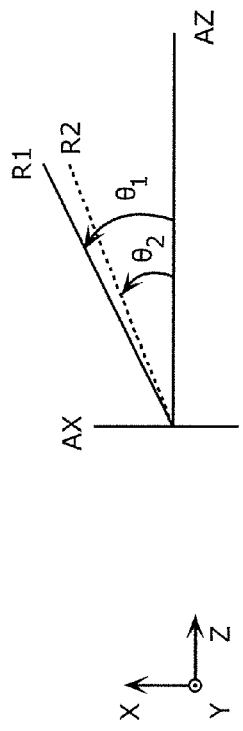
FIG. 14 illustrates an exemplary result of the determining of the angle of the direction of a target object in the embodiment.

FIG. 14 is a graph illustrating an exemplary result of the determination of the angle of the direction of the target object 40 in the present embodiment.

The angle calculator 35 feeds back the calculated angle (θ1 or θ2) to the mirror drive unit 24. The mirror drive unit 24 adjusts a drive signal to output to the MEMS mirror 23 according to the calculated angle received from the angle calculator 35 so that the scanning angle is constant.

In this configuration, it is possible to calculate an angle corresponding the time of detection of the target object 40 even when the range of scanning of the laser light along the X axis changes. Furthermore, it enables adjustment of the range of scanning of the laser light along the X axis.

[3. Advantageous Effects]

The laser rangefinder 10 in the present embodiment calculates the distance from the opening to the target object 40 by subtracting a calculated length of a light path inside the laser rangefinder from the distance to the target object 40 calculated using the first reflected light. Here, the distance to the target object 40 calculated using the first reflected light and the length of a light path inside the laser rangefinder are both affected by signal delay due to temperature change, time degradation, and other factors. Therefore, subtracting the calculated length of a light path inside the laser rangefinder from the distance to the target object 40 calculated using the first reflected light cancels out the influence of the signal delay.

The laser rangefinder 10 in the present embodiment calculates an angle corresponding to the time of detection of the target object 40, using a waveform of light received by the first photodetector 27. As illustrated in FIG. 11, the range of scanning of the laser light changes due to factors such as temperature change. Accordingly, there may be a difference between an oscillation angle indicated as an instruction in a control signal to the MEMS mirror 23 and the actual oscillation angle of the MEMS mirror 23. In the present embodiment, it is possible to calculate an angle using the first photodetector 27, so that the direction of the target object 40 is determined more correctly.

Furthermore, the laser rangefinder in the present embodiment can be implemented by providing the first photodetector 27 in which the paint 27c is applied onto the light-receiving surface 27b of the photodetector 27a. Thus, the laser rangefinder does not require a special component, and thus is manufacturable at a cost with moderate increase.

Furthermore, the laser rangefinder 10 thus configured calculates both the distance to the target object 40 and the angle of the direction using the simple methods as described above.

Furthermore, the first photodetector 27 in the first laser rangefinder 10 in the above-described embodiment need not be positioned with a high degree of precision, and thus the laser rangefinder 10 can be assembled with ease.

The first photodetector 27 need not be disposed in a position where external light is not incident. Influence of external light can be curbed when the first photodetector 27 in the present embodiment has the light-receiving surface 27b oriented in the same direction as the traveling direction of external light or in such a direction that external light cannot be incident on the light-receiving surface 27b.

[4. Variations]

[4-1. Variation 1]

Figure 15:
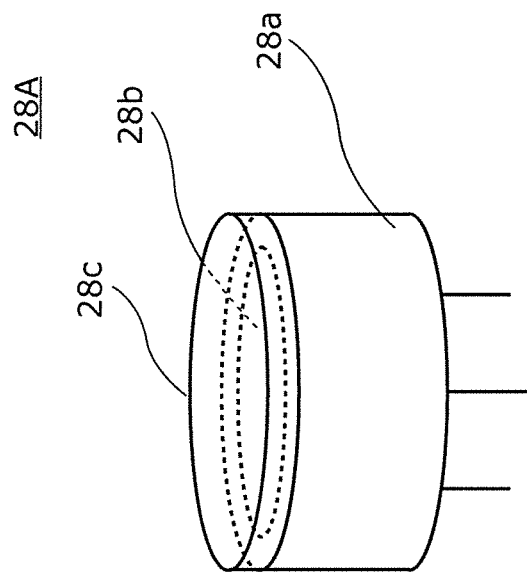
FIG. 15 illustrates an exemplary configuration of the first photodetector in Variation 1 of the embodiment.
Figure 16:
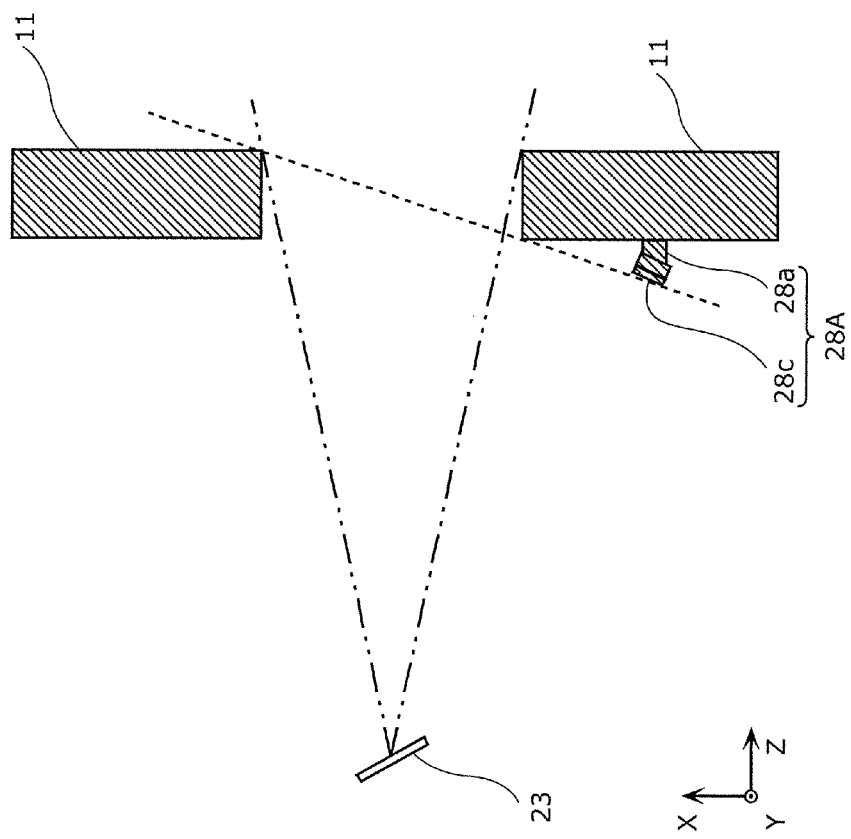
FIG. 16 illustrates the exemplary configuration of the first photodetector in Variation 1 of the embodiment.

The following describes Variation 1 of the above-described embodiment with reference to FIGS. 15 and 16.

For Variation 1, the following describes a difference in the first photodetector from the above-described embodiment. The constituent elements other than the first photodetector and the operation of the signal processor are the same as those in the above-described embodiment.

The first photodetector 27 in the above-described embodiment includes the photodetector 27a having the light-receiving surface 27b the center of which the paint 27c is applied to, whereas a first photodetector 28A in Variation 1 has a reflective diffuser plate 28c above a light-receiving surface 28b of the first photodetector 28A.

FIG. 15 and FIG. 16 illustrate an exemplary configuration of the first photodetector 28A in Variation 1. The first photodetector 28A of a laser rangefinder 10A in Variation 1 includes a photodetector 28a and the reflective diffuser plate 28c provided on a light-receiving surface 28b of the photodetector 28a as illustrated in FIG. 15. The reflective diffuser plate 28c transmits part of light.

The first photodetector 28A is disposed close to the opening of the enclosure 11, at such a position that none of external light is incident on the reflective diffuser plate 28c as illustrated in FIG. 16. The reflective diffuser plate 28c disposed at the position reduces influence of external light.

[4-2. Variation 2]

Figure 17:
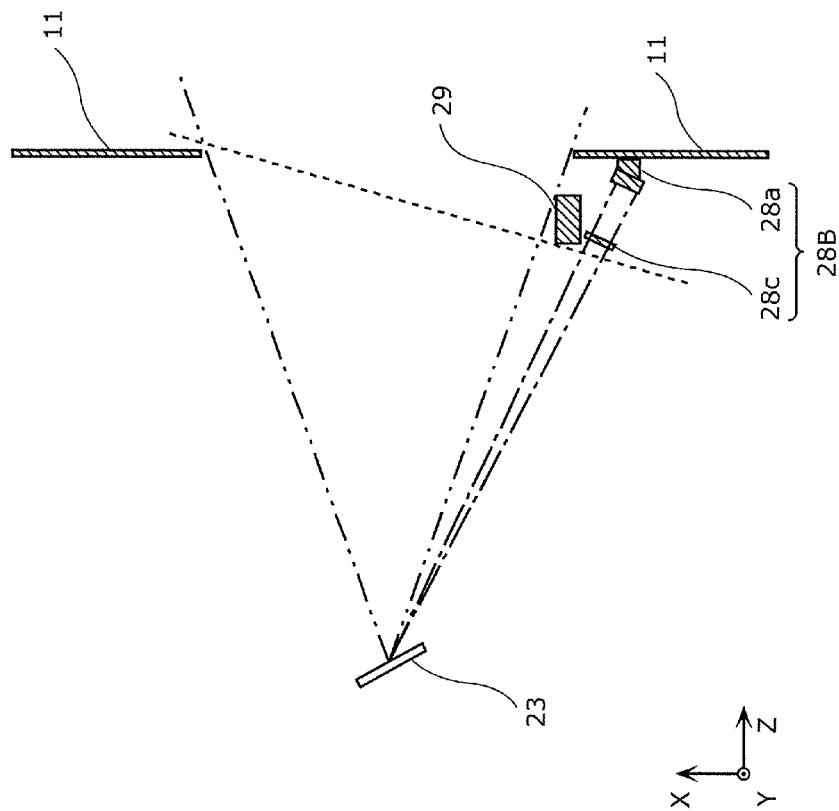
FIG. 17 illustrates an exemplary configuration of the first photodetector in Variation 2 of the embodiment.

The following describes Variation 2 of the above-described embodiment with reference to FIG. 17.

For Variation 2, the following describes a difference in the first photodetector from the above-described embodiment and Variation 1. The constituent elements other than the first photodetector and the operation of the signal processor are the same as those in the above-described embodiment and Variation 1.

The first photodetector 28B of a laser rangefinder 10B in Variation 2 includes the photodetector 28a, the reflective diffuser plate 28c, and a light blocking plate 29.

FIG. 17 illustrates an exemplary configuration of the first photodetector 28B in Variation 2. The light blocking plate 29 is an example of a shield that blocks external light traveling toward the reflective diffuser plate 28c, and is disposed at such a position that the light blocking plate 29 blocks the external light that is otherwise incident on the reflective diffuser plate 28c as illustrated in FIG. 17. Referring to in FIG. 17, the position of the light blocking plate 29 is apart from the photodetector 28a. Optionally, the light blocking plate 29 may be disposed close to the photodetector photodetector 28a. The reflective diffuser plate 28c is disposed in a region where external light is blocked by the light blocking plate 29 and thus is not incident, and is in the light path between the MEMS mirror 23 and the photodetector 28a.

Such configuration of the light blocking plate 29 and the reflective diffuser plate 28c reduce influence of external light. Accordingly, the target object 40 can be detected even when the intensity of the first reflected light from the target object 40 is low.

Other Embodiments

The present invention is not limited to the laser rangefinder according to the above-described embodiment or the variations thereof.

For example, a laser rangefinder according to the present invention may further include a mechanism to detect angles on a plane including the Y axis.

Furthermore, the present invention is applicable not only to a monocular laser rangefinder but also to a laser rangefinder including separate lenses including a lens for outputting laser light and a lens for receiving light reflected off from the target object 40.

Furthermore, the MEMS mirror is not limited to a monoaxial one described above as the MEMS mirror 23 in the above-described embodiment or the variations thereof. A biaxial MEMS mirror may be used instead.

Furthermore, the above-described embodiments and the variations thereof may be applied in any combination thereof.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The above-described embodiment and the variations thereof are applicable to a laser rangefinder that measures the distance to a target object.

The invention claimed is:

1. A laser rangefinder comprising:
an enclosure;
a light source that is disposed inside the enclosure and emits laser light;
a scanning unit that changes a traveling direction of the laser light;
a first photodetector that is disposed inside the enclosure, reflects a portion of the laser light directed in a predetermined direction from the scanning unit, and receives another portion of the laser light;
a second photodetector that receives first reflected light and second reflected light, the first reflected light being reflection of the laser light from a target object outside the enclosure, and the second reflected light being reflection of the portion of the laser light from the first photodetector; and
a signal processor that calculates a distance from the laser rangefinder to the target object and calculates a direction of the target object with respect to the laser rangefinder, the distance being calculated by (i) calculating a first distance from the light source to the target object using the first reflected light received by the second photodetector, (ii) calculating a second distance from the light source to the first photodetector using the second reflected light received by the second photodetector, and (iii) subtracting the second distance from the first distance, and the direction being calculated by using time points of the receiving of the another portion of the laser light by the first photodetector.

2. The laser rangefinder according to claim 1,
wherein the first photodetector has a light-receiving surface having a portion to which paint that reflects the another portion of the laser light is applied.

3. The laser rangefinder according to claim 2,
wherein the light-receiving surface has a first circular shape, and
the portion to which the paint is applied has a second circular shape smaller than the first circular shape.

4. The laser rangefinder according to claim 3,
wherein the portion to which the paint is applied is at a center of the light-receiving surface.

5. The laser rangefinder according to claim 1,
wherein the first photodetector includes:
a photodetector; and
a reflective diffuser plate disposed between the photodetector and the scanning unit.

6. The laser rangefinder according to claim 5,
wherein the first photodetector is disposed at a position where none of external light entering the enclosure through an opening of the enclosure is directly incident.

7. The laser rangefinder according to claim 5,
wherein the first photodetector further includes a shield that blocks external light entering the enclosure through an opening of the enclosure and traveling toward the reflective diffuser plate, and
the reflective diffuser plate is disposed adjacent to the shield between the first photodetector and the scanning unit.

8. The laser rangefinder according to claim 1,
wherein the signal processor calculates the direction of the target object with respect to the laser rangefinder by obtaining a time point of the detecting of the target object,
determining an interval between time points at which the laser light passes over the first photodetector, from the time points of the receiving of the another portion of the laser light by the first photodetector,
calculating a sine wave representing directional displacement of the laser light against time, using the interval and an angle of the predetermined direction, and
calculating a direction of the laser light using the sine wave and the time point of the detecting of the target object.

9. The laser rangefinder according to claim 1,
wherein the first photodetector is disposed close to an opening of the enclosure.

10. The laser rangefinder according to claim 1,
wherein the first photodetector unit is disposed close to an end of a scanning range of the laser light scanned by the scanning unit.

11. The laser rangefinder according to claim 1,
wherein the scanning unit includes a mirror portion that oscillates about a predetermined axis and reflects the laser light emitted from the light source.

12. The laser rangefinder according to claim 11, further comprising
a mirror that is in a path of the laser light between the light source and the mirror portion, transmits the laser light from the light source toward the mirror portion, and reflects, toward the second photodetector, the first reflected light and the second reflected light reflected by the mirror portion.

13. The laser rangefinder according to claim 12,
wherein the mirror includes a reflective surface and a hole in the reflective surface, and
the laser light from the light source passes through the hole.

14. The laser rangefinder according to claim 11,
wherein the scanning unit is a microelectromechanical system (MEMS) mirror.

15. A method of measuring a distance and a direction, the method comprising:
changing a traveling direction of laser light from a light source with time;
when the laser light is directed in a predetermined direction, reflecting a portion of the laser light and receiving another portion of the laser light at a predetermined position inside an enclosure of a laser rangefinder;

receiving second reflected light that is the portion of the laser light reflected at the predetermined position;
when the laser light is directed in a direction other than the predetermined direction, receiving first reflected light reflected by a target object outside the enclosure;
calculating a first distance from the light source to the target object using the first reflected light;
calculating a second distance from the light source to the predetermined position using the second reflected light;
calculating a distance from the laser rangefinder to the target object by subtracting the second distance from the first distance; and
calculating a direction of the target object with respect to the laser rangefinder using time points of the receiving of the another portion of the laser light.

* * * * *